July 6, 1954  F. W. RUEGG  2,682,747
COMBINED FUEL INJECTOR AND FLAME STABILIZER
Filed March 10, 1953

Inventor
FILLMER W. RUEGG

Patented July 6, 1954

2,682,747

UNITED STATES PATENT OFFICE 2,682,747

COMBINED FUEL INJECTOR AND FLAME STABILIZER

Fillmer W. Ruegg, Arlington, Va., assignor to the United States of America as represented by the Secretary of the Navy Application March 10, 1953, Serial No. 341,630

4 Claims. (Cl. 60—39.72)

(Granted under Title 35, U. S. Code (1952), sec. 266)

This invention relates to improvements in combustion engines and particularly the fuel burning aspect thereof.

The general practice today in the manufacture of aircraft jet engines is to provide a fuel injection or induction system together with a flame holder to stabilize the flame front in the engine. It is an object of the present invention to provide a combination fuel injector and flame stabilizer, made so by the construction and location of the fuel injection means within the engine. This eliminates the necessity of a flame holder but retains the advantages and benefits ordinarily derived therefrom.

There is some latitude permissible in the specific embodiments of the invention since there are variable factors in broad or general engine use and construction. Thus, for a combustion chamber of high output with substantially axial flow, fuel injection is advantageously practiced by directing streams transverse to the flow path and from a grid having grid members spanning the chamber thereby separating the main flow, instantaneously at least, into several smaller flow tubes, whereby the attendant turbulence produced at and behind the points of airstream separation are instrumental in admixing the fuel with the airstream. To obtain equal results in an engine where the airstream is not axial the construction of the grid and/or the direction of fuel discharged may be altered. In addition, the nature of the fuel used in the engine may dictate slight structural modification.

Other objects and features of importance will become apparent in following the description of the illustrated form of the invention.

Figure 1:
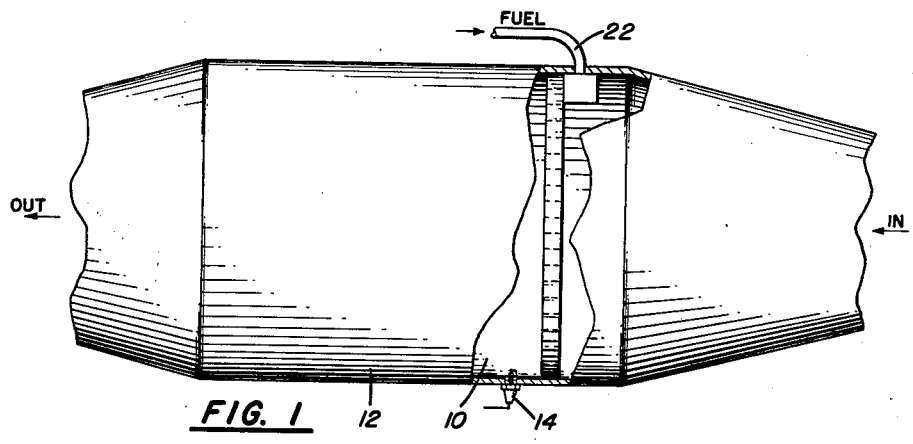
Fig. 1 is an elevational view of a typical jet engine combustor, parts being shown schematically and in section, the combination fuel injector and flame stabilizer being shown in place.
Figure 2:
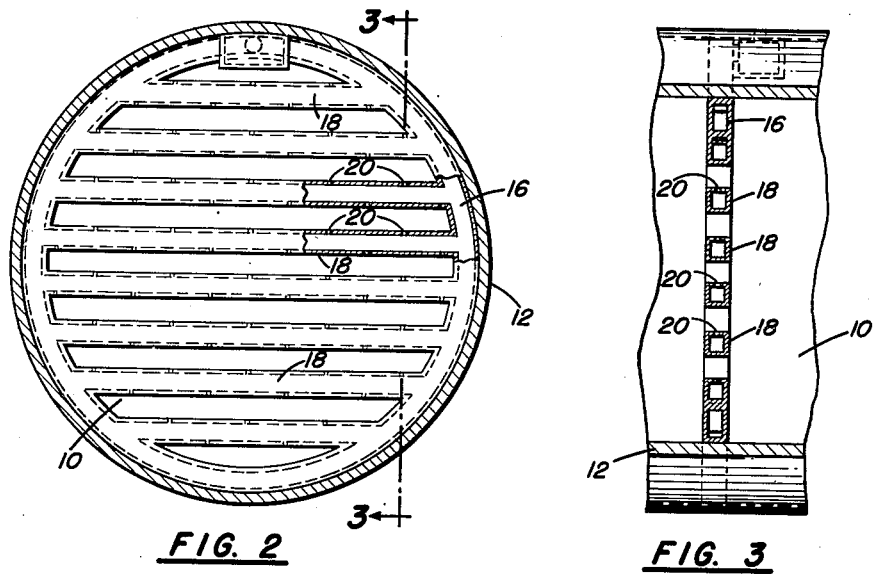
Fig. 2 is a transverse sectional view of the combustor of Fig. 1.
Figure 3:
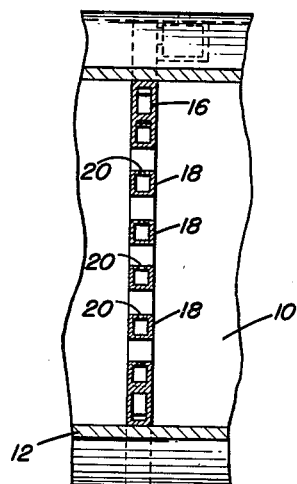
Fig. 3 is a sectional view taken on the line 3—3 of Fig. 2 and in the direction of the arrows.

In Fig. 1 the combustion chamber 10 defined by wall 12 of a conventional engine is schematically shown. A device for initiating combustion, as spark plug 14, is provided in the combustion chamber and is used in the known way.

In jet engines, usually a fuel injection system is used together with a flame holder to stabilize the flame front at the most advantageous place in the combustion chamber. It has been found that a combined fuel injector and flame stabilizer may be utilized, obviating the necessity of a flame holder, as such, but retaining the benefits of a flame holder. One embodiment of the combination flame holder or stabilizer and fuel injector is shown in the drawing, and comprises a header 16 shaped to conform to the shape of the combustion chamber, in the illustrated example, the header and combustion chamber being annular and circular, respectively.

A plurality of fuel conducting tubes 18 are connected at both ends to opposed parts of the annular header 16 so that fuel may flow from the header into the tubes. Lateral discharge orifices 20 are provided in tubes 18 through which fuel may be emitted.

In operation fuel enters header 16 through conduit 22, the fuel in the system being under pressure as would be suitable for the system and impressed by a fuel pump. The fuel fills the header 16 and tubes 18, and also passes through orifices 20. In the shown embodiment the air-flow into the combustion chamber 10 is directed axially and the tubes 18 are arranged in a single plane normal to the air-flow. The direction of fuel discharge is coplanar with the tubes 18 and therefore, the fuel is emitted in a direction transverse to the gas flow into and through chamber 10. During fuel burning a stable flame front is established downstream of the tubes 18 and thus, no flame holder is required.

Tubes 18 are spaced from each other and when the air-flow passes the tubes 18, the flow is separated into individual, smaller streams. With orifices provided on the upper and lower surface of each tube 18, each smaller stream is fed fuel into the top layer and the bottom layer thereof. The separation of the main flow into individual smaller streams is accompanied by turbulent low velocity immediately downstream of the tubes, and this is the zone of stabilization.

Modifications of the illustrated embodiment of the invention may be made. For example, square cross section tubes 18 are shown, but if desired, other shapes may be used. Also, the angle at which fuel is discharged into the flow may be altered to obtain the greatest efficiency and effectiveness for the burning characteristics of the particular engine to which the invention is applied.

The invention described herein may be manufactured and used by or for the Government of the United States of America for governmental purposes without the payment of any royalties thereon or therefor.

What is claimed is:

1. In an engine combustion chamber, a combined fuel injector and flame stabilizer comprising a header of a shape to conform to the interior cross-sectional configuration of said chamber, said header having a fuel inlet, and coplanar means disposed within said chamber and connected to said header for supplying fuel from said header into said chamber substantially normal to the flow path into said combustion chamber, said means consisting of a grid of fuel conducting tubes, each tube having two ends that are connected with said header at spaced places thereof and provided with a plurality of orifices.

2. In a combustion chamber defined by a cylindrical wall having a gas inlet and a gas outlet, a combined fuel injector and flame stabilizer disposed in said combustion chamber between said inlet and said outlet and comprising a grid having a plurality of spaced fuel conducting tubes arranged transversely of said chamber and functioning to separate the gas flow into said chamber into a number of smaller streams and providing a turbulent region thereadjacent, said tubes having fuel discharge orifices to deliver fuel into the smaller streams whereby the fuel is admixed with the streams in the turbulent flow region to thereby stabilize the flame in said chamber near said tubes.

3. The combination of claim 2 and; an annular header to which said tubes are connected and disposed within said cylindrical wall.

4. The combination of claim 2 and; the orifices in said tubes having their longitudinal axes arranged normal to the longitudinal axis of the chamber and the gas flow therethrough, so that fuel delivery into the gas flow is at right angles thereto.

References Cited in the file of this patent

UNITED STATES PATENTS

| Number | Name | Date |
|---|---|---|
| 2,385,833 | Nahigyan | Oct. 2, 1945 |
| 2,510,572 | Goddard | June 6, 1950 |
| 2,520,388 | Earl | Aug. 29, 1950 |
| 2,632,300 | Brzozowski | Mar. 24, 1953 |